UNITED STATES PATENT OFFICE.

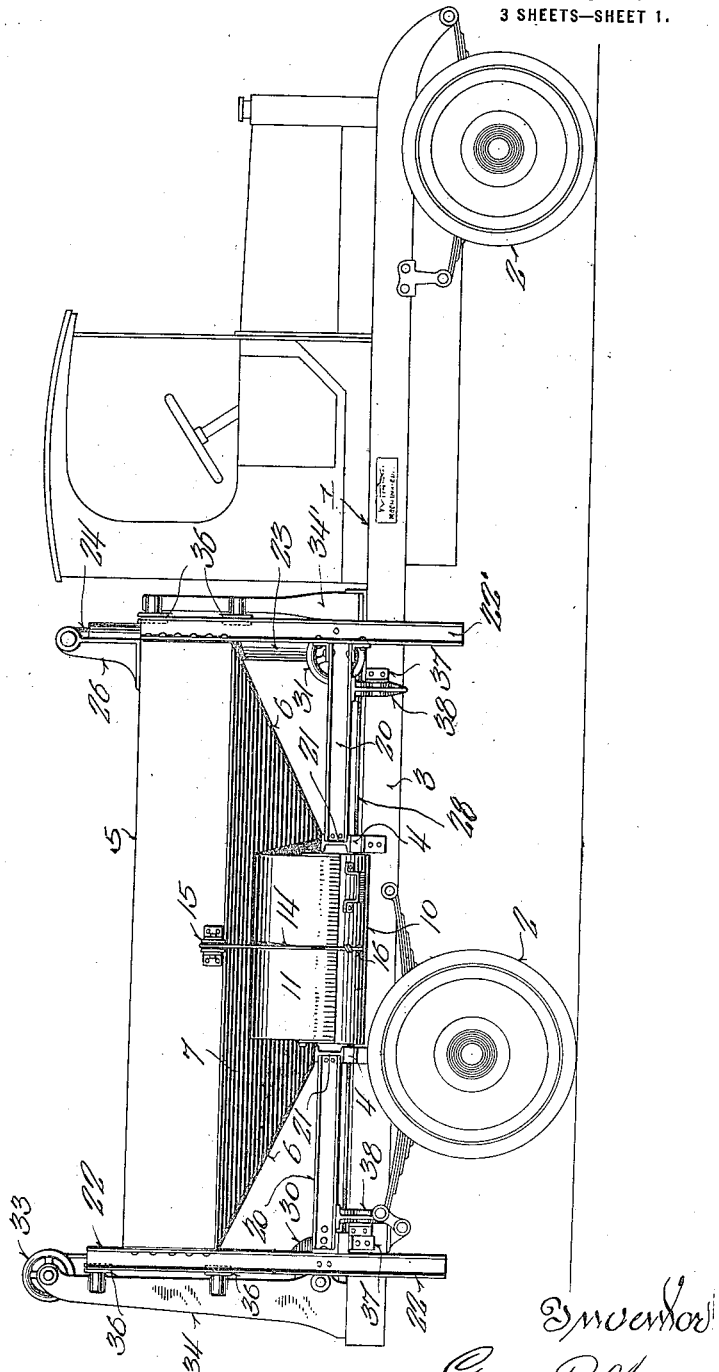

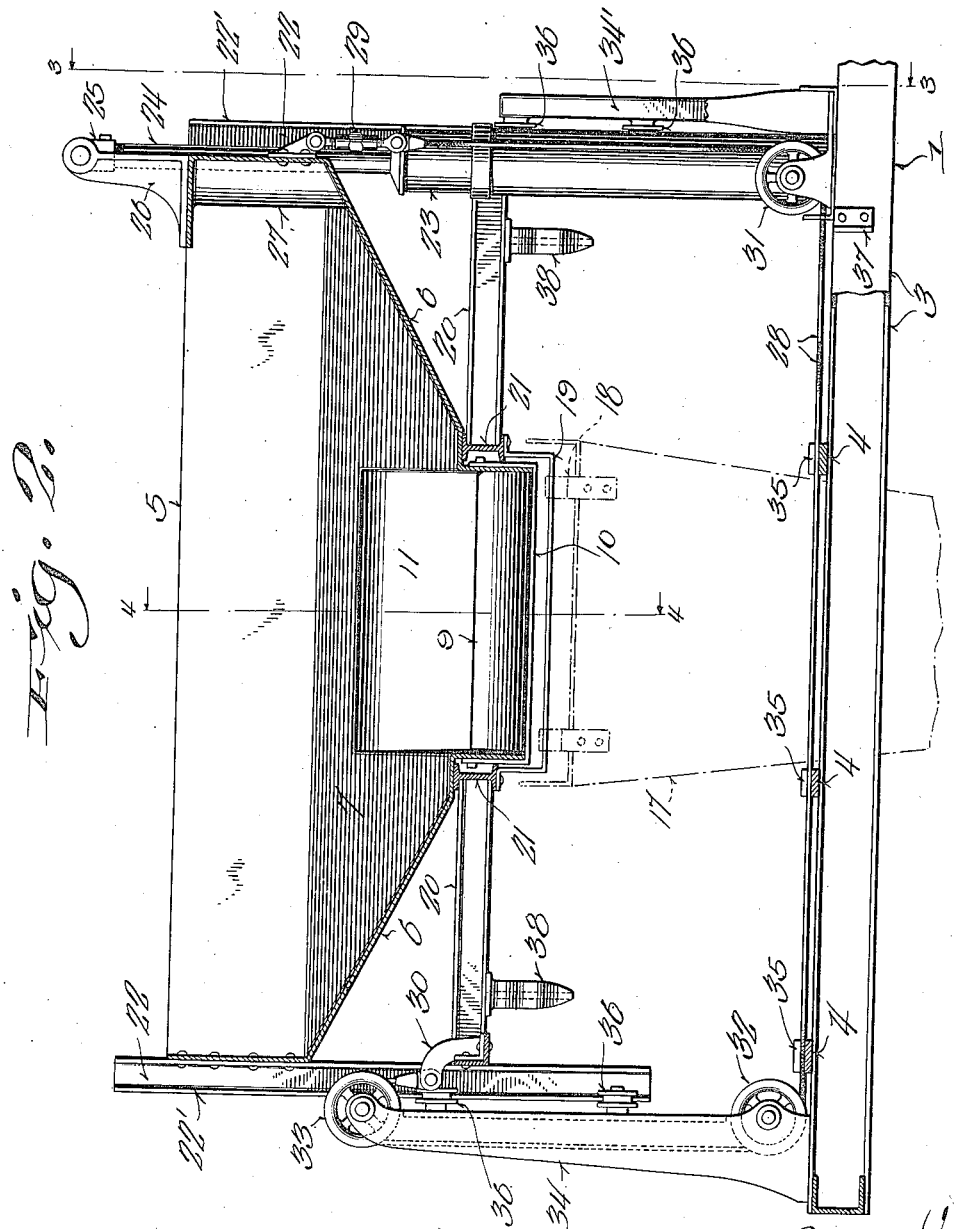

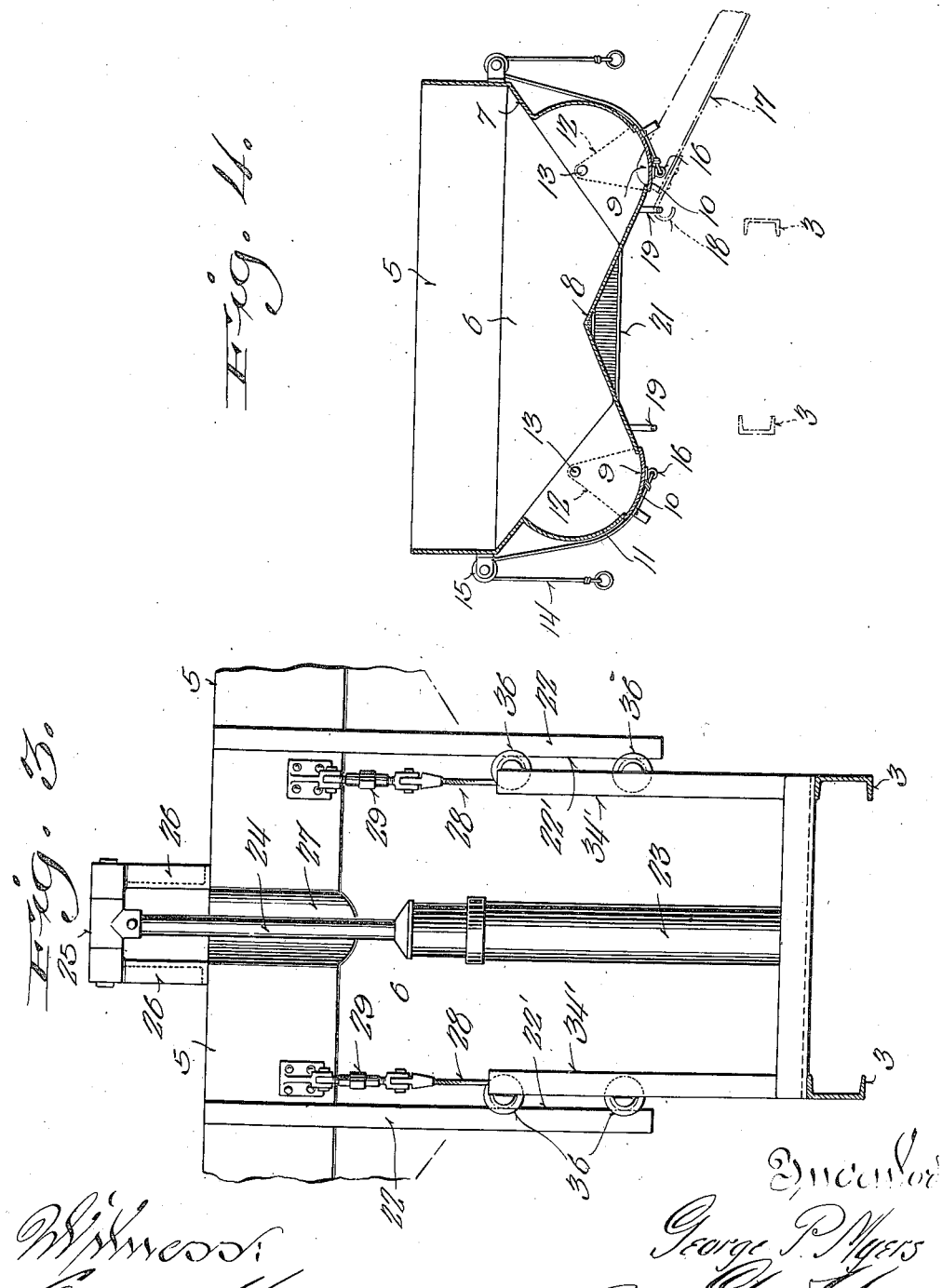

GEORGE P. MYERS, OF SHEBOYGAN, WISCONSIN, ASSIGNOR TO MYERS MACHINE CO., OF SHEBOYGAN, WISCONSIN.

ELEVATING MECHANISM FOR TRUCK-BODIES.

1,272,840.

Specification of Letters Patent.   Patented July 16, 1918.

Application filed June 11, 1917.   Serial No. 173,952.

*To all whom it may concern:*

Be it known that I, GEORGE P. MYERS, a citizen of the United States, and resident of Sheboygan, in the county of Sheboygan and State of Wisconsin, have invented certain new and useful Improvements in Elevating Mechanism for Truck-Bodies; and I do hereby declare that the following is a full, clear, and exact description thereof.

My invention relates to improvements in dump vehicles, particularly those of the automobile type.

It is primarily the object of this invention to construct a truck having simple means whereby its body may be raised vertically and maintained horizontally to permit a discharge chute to be placed in position beneath a central discharge opening in the bottom of said truck.

More specific objects of the invention relate to means for maintaining the movable body against side play and for holding it rigidly during the raising and lowering movement thereof; to secure the vehicle frame and the body frame which carries the dump body against shifting relative to each other when said body is in its lowered position, and to improve upon the construction of the dump body and the means for discharging therefrom.

With these and other objects in view the invention resides in the novel features of construction, combination and arrangement of parts which will be hereinafter more particularly described and claimed, and shown in the drawings wherein:

Figure 1 represents a side elevational view of an automobile truck having a dump body and raising means therefor mounted thereon, said body and raising means being constructed in accordance with the present invention.

Fig. 2 is a longitudinal vertical section through the dump body and the adjacent portions of the vehicle frame showing the appearance of the parts when said body is in its raised position.

Fig. 3 is a vertical transverse section on the plane of the line 3—3 of Fig. 2, and Fig. 4 is a similar view on the plane of the line 4—4 of Fig. 2.

In the accompanying drawings the invention is shown mounted upon a truck of conventional design which includes a truck or vehicle frame 1 mounted upon suitable wheels 2 and carrying the usual engine and driving means. The frame 1 includes side bars 3 and transverse supporting beams 4, which are secured to and rest upon the top of said bars.

The preferred construction of the dump body 5 to be used with the other parts of the invention is clearly shown in the several figures of the drawing and consists of downwardly and inwardly inclined end and side walls 6 and 7 respectively, which thus converge at a point substantially central of the body. The material disposed in the body will therefore tend to move toward the center and thus facilitate discharge thereof in a manner to be more particularly pointed out. The extreme bottom of the body formed by the convergent side walls is longitudinally inverted V-shaped as shown at 8.

Thus the material in the body is caused to flow in two directions through openings 9 in the opposite side walls 7 when the covers 10 of said openings are moved in the proper directions. These openings 9 are preferably formed in the lower portion of substantially semi-cylindrical pockets 11 which are formed by pressing or stamping the side walls 7 outwardly at points midway their ends. The covers 10 which close the openings 9 have laterally extending portions 12 for engagement with the ends of the pockets 11 and are pivoted thereto as at 13. The covers 10 are opened by pulling downwardly on the free ends of cables 14 which are trained over pulleys 15 secured to the sides 7 of the body, said cables being attached at 16 to the outer sides of the arcuate plates which form the covers 10.

The material which is permitted to flow through the openings 9 is conveyed to suitable points by the provision of chutes or the like 17, the same being provided with hooks 18 for engagement with suitable U-shaped hangers 19 as shown in Fig. 4. In order to properly position the chutes and to provide sufficient inclination therefor, the body 5 is raised upwardly a considerable distance above the vehicle frame 1.

The means for permitting this raising operation forms one of the important features of my invention. In carrying out this function, the body 5 is mounted on a suitable frame which comprises side beams 20, transverse beams 21, and end uprights 22, all of which are preferably in the shape of I-beams. The extreme bottom of the body 5 is secured to the intermediate pair of transverse beams 21, and the ends are secured to the upper portions of the end uprights 22, four of which are provided, one for each corner of the body. As shown in Fig. 1, the bottoms of the transverse beams 21 are adapted to rest upon the transverse beams 4 of the vehicle frame when the body is in its lowered position.

The actual lifting operation of the body 5 is procured by a fluid operated piston mounted within the vertically positioned cylinder 23 disposed, as is usually the case, at the forward portion of the vehicle frame immediately behind the driver's cab. This cylinder is suitably braced to the stationary portions of the vehicle frame and compressed fluid is fed thereto in any ordinary or preferred manner. The upper end of the piston rod 24 is provided with a head 25 which is pivoted between arms 26 of a suitable bracket, which is secured to the body 5. The portion of the body adjacent the cylinder 23 is recessed as at 27 for an obvious purpose.

Since it is desirable to maintain the body substantially horizontal during this raising and lowering operation, a pair of flexible cables 28 have their opposite ends secured to the body 5 and body frame respectively. The ends of the cables, which are attached to the body, are provided with adjustable attaching links 29, and the points of attachment are on each side of the cylinder 23. The opposite ends of the cables are attached to brackets 30 on the side beams 20 of the body frame, and the intermediate portions of the cables are trained around pulleys 31, 32 and 33. The pulleys 31 are mounted in suitable bearings on the vehicle frame 1 on opposite sides of the cylinder 23, the pulleys 32 are disposed at the opposite end of the vehicle frame and are journaled in bearings carried by standards 34 on said vehicle frame, and the pulleys 33 are journaled in the upper ends of said standards 34. The intermediate stretches of the cables rest in notches or recesses 35 cut in the transverse beams 4, as shown in Fig. 2.

By this simple arrangement of pulleys and cables it is obvious that the rear end of the body frame will be maintained in the same horizontal plane as the forward end, which is acted upon directly by the piston rod 24. In other words, the force which the upwardly moving piston imparts to the front end of the dump body will be equally distributed between both ends of the body frame. The body is thereby maintained substantially level and the material therein is readily expelled therefrom when either one or both of the covers 10 over the openings 9 are raised. When the body is in its elevated position, the chutes 17 have sufficient inclination to direct the discharged material to considerable distances from the vehicle, and thus it is a considerable improvement over those dump vehicles in which only the front end of the body is elevated.

The end uprights 22 not only brace the body and the other parts of the body frame, but also serve to steady the same during vertical movement and prevent side play. This is carried out by the provision of flanged or grooved rollers 36 revolubly mounted on stub shafts which project inwardly from the rear standard 34 and from front standards 34', the latter being mounted upon the vehicle frame adjacent the pulleys 31. The axes of rotation of these rollers 36 are longitudinal of the vehicle, and the grooves therein receive the inner flanges 22' of the end uprights 22, as is clearly shown in the various figures in the drawing. Since the uprights are disposed outwardly of the rollers, the body frame cannot move transversely relative to the vehicle frame, and the engagement of the flanges of the rollers and of the uprights prevents longitudinal movement of the body frame. The uprights 22 depend a considerable distance below the body and therefore the flanges thereof will be engaged with the rollers throughout the vertical movement of the body. When the body and its frame are in lowered position, additional means is provided for holding the same against shifting relative to the vehicle frame 1. This consists of coacting stop members carried by the two frames, the members on the vehicle frame being substantially right angular plates 37, and the members on the body frame depending from the side beams 22 are in the form of fingers 38 which engage both the plates 37 and the adjacent surfaces of the side bars 3. A pair of each of these stop members are positioned on each side of the vehicle frame and therefore any tendency of the two frames to shift relative to each other is entirely obviated.

I claim:

1. A machine of the class described comprising in combination, a vehicle frame, a body supported thereon, a cylinder secured to the vehicle frame at one end of the body, a fluid operated piston movable in said cylinder, one end of the piston being pivoted to the adjacent end of the body, a guide on the vehicle frame adjacent the cylinder, a standard at the other end of the vehicle frame, a guide on the upper end of the standard, an additional guide on the vehicle frame adjacent the base of the standard, and a flexible member trained around said guides and secured at its opposite ends to the opposite ends of the body whereby when said piston is moved upwardly, the body will be raised horizontally.

2. A machine of the class described comprising in combination, a vehicle frame including side bars, a body supported on the frame, means for raising and lowering said body with respect to said frame, a plurality of right angular plates, each secured by one flange to the side bars of the frame, the other flanges being extended laterally, and a plurality of fingers depending from the body, each finger being engaged with one face of one side bar and the lateral flange of one right angular plate.

In testimony that I claim the foregoing I have hereunto set my hand at Sheboygan, in the county of Sheboygan and State of Wisconsin.

GEO. P. MYERS.